(No Model.)
M. R. MOORE.
BALANCED SLIDE VALVE.
No. 362,525. Patented May 10, 1887.
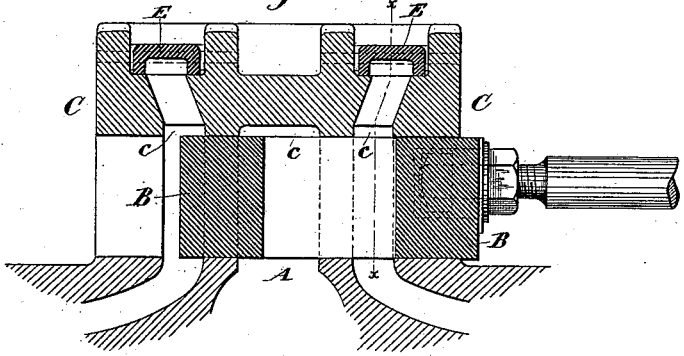
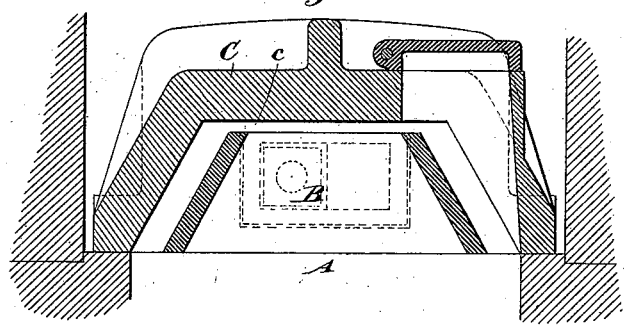
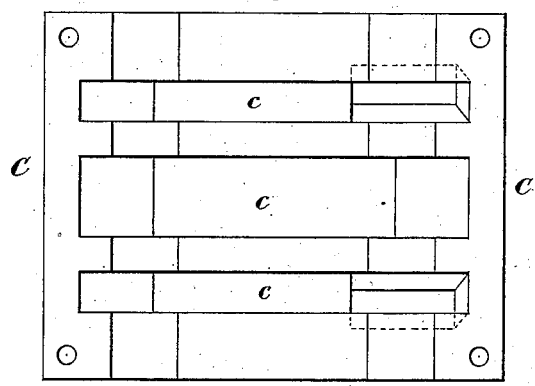
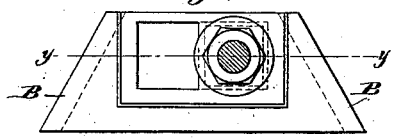
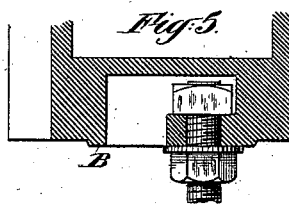
Witnesses:
Charles R. Searle
Manierre Ellison
Inventor:
M. R. Moore
by his attorney
Thomas Drew Stetson
N. PETERS, Photo-Lithographer, Washington, D. C.

UNITED STATES PATENT OFFICE.

MATTHEW ROBERT MOORE, OF INDIANAPOLIS, INDIANA, ASSIGNOR TO THE ATLAS ENGINE WORKS, OF SAME PLACE.

BALANCED SLIDE-VALVE.

SPECIFICATION forming part of Letters Patent No. 362,525, dated May 10, 1887.

Application filed December 11, 1885. Serial No. 185,372. (No model.)

*To all whom it may concern:*

Be it known that I, MATTHEW R. MOORE, of Indianapolis, Marion county, in the State of Indiana, have invented a certain new and useful Improvement in Balanced Slide-Valves for Steam-Engines; and I do hereby declare that the following specification contains such a full, clear, and exact description of my invention as will enable any person skilled in the art to which it pertains to understand, make, and use the same, reference being had to the accompanying drawings hereto attached, and forming part of this specification.

I have attained all that is desirable in an equilibrium-valve without introducing any new defects or materially increasing the cost of manufacture of the valve or of the engine to which it is to be applied.

My balanced valve is peculiarly adapted for ready compensation for wear, and does not require any peculiar adaptation of the cylinder or steam-chest, and hence can be applied to engines already in use.

There are two principal classes of balanced slide-valves: First, pressure-plate valves—flat slides in which the pressure of the steam is taken off the back of the valve by means of the steam-chest cover or some special rigid plate or hood introduced in the steam-chest for the purpose; and, second, piston-valves, where the valve, usually cylindrical for convenience of manufacture, but which may be theoretically of any shape, moves steam-tight in a casing, as a piston moves in a cylinder, and the steam, being forbidden access to its sides, and acting in opposite directions against its ends, causes a balance of pressures.

A common defect of valves of the first class is that they make no provision for balancing pressure from the cylinder due to steam already admitted, or to compression after exhaust closure, acting outward on the area of the valve which covers the port, and which varies in intensity from that of the exhaust up to or even above that in the boiler. They cannot lift off their seats to relieve pressure from such source, being held down by the pressure-plate or hood. Excessive pressure from this cause, due to water entrapped within the cylinder by the closing of the valve, is liable to cause destructive accident. Sometimes the pressure plate or hood is not fastened to the valve-seat, the object of leaving it loose being to allow it to rise with the valve and so relieve pressure from within; but the area of the back of the plate or hood is necessarily many times greater than the area of the port through which the internal pressure acts, so that it is practically immovable, and the provision for allowing it to rise fails to accomplish any good result. It simply renders the parts more liable to become displaced.

Valves of the second class—piston-valves—have the ports extended quite around, so that any pressure from any source is certainly balanced; but to secure sufficient portage the valve must be made very large relatively to a flat slide of equal opening, involving increased friction, weight, wear, &c., and as the valve wears smaller while its casing wears larger it rapidly grows leaky and must be replaced.

Piston-valves are peculiarly subject to objection in case of water in the cylinder. Such valves cannot possibly leave their seats.

I have combined the advantages of valves of the two classes—hooded slide-valves and piston-valves—and have eliminated their defects. While having the general form of a hooded valve, my valve is really a piston-valve, made in such shape as to secure large port-opening without excessive weight, while the form is easy to refit in case of leakage from wear. I combine with it a special provision for relieving back-pressure.

The following is a description of what I consider the best means of carrying out the invention.

Figure 1 is a vertical section in a plane extending longitudinally of the cylinder. Fig. 2 is a section on the line *x x* in Fig. 1. The remaining figures represent separate parts detached. Fig. 3 is a bottom view of the hood. Fig. 4 is an end view of the valve, and Fig. 5 is a horizontal section through a portion on the line *y y* in Fig. 4.

The same letters refer to like parts in all the figures where they occur.

The valve B has a plane face shaped to match steam-tight against a plane cylinder-face, A, like an ordinary slide-valve. Its back is plane and parallel to the face. Its cross-section is trapezoidal—that is to say, each side is beveled to an angle of about sixty (60°) degrees with the cylinder-face. It is covered with a corresponding hood, C, open at each end, but fitting steam-tight to the back and beveled sides.

The hood C is made with grooves $c$ $c$, corresponding to the ports in the seat and running around over the back of the valve. The ends of the ports not covered by the valve match these grooves, so that the pressure of the steam in each cylinder-port is admitted to all sides of that part of the valve which covers that port, thus securing a balance of pressure. The ribs or bands in the hood between the grooves correspond to the bridges of the seat. They are scraped to a steam-tight joint with the back and sides of the valve, which slides steam-tight in the space between the seat and the hood, as a piston slides in a cylinder. In order to relieve any over-pressure which may occur in the cylinder from excessive compression, or from water therein, ports are made through the back of the hood, which are covered by self-acting flap-valves E E, as shown in the drawings. These are held to their seats by gravity and by the pressure of steam in the steam-chest. They remain closed at all times, except when the pressure beneath them exceeds that in the steam-chest, when they open and release the excess by allowing the water or steam, or both, to flow backward toward the boiler. (Not shown.)

The proportionate width of ports, bridges, and laps may be the same as they would be in any well-constructed slide-valve engine. At first sight it may seem that in making my valve narrower than the seat I have sacrificed some of the port-openings; but when the end of the valve passes the edge of the port to open it the opening occurs all around the valve, into the port and the corresponding groove in sides and back of the hood so that in effect, this valve opens more rapidly and wider than would an ordinary slide-valve on the same seat for a like amount of movement. When the valve has fully passed the port, its whole area is exposed, as it would be with the ordinary valve. I thus secure a quick opening and closing with only the ordinary valve motion.

The hood C is fixed to the seat by means of small bolts in the corners, and is strongly ribbed to stiffen it, so that the pressure cannot change its shape. If at any time the valve-seat or hood should become cut or worn so as not to be steam-tight, they may be refitted by filing and scraping. The valve, on account of its beveled sides, will fill the hood by going farther into it, and by scraping the bottom of the hood C to lower it the steam-joint between the valve and seat may be restored. Thus this valve (unlike the ordinary cylindrical piston-valve, which, when worn smaller than its casing, must be replaced by a new one) may be quickly and cheaply refitted without recourse to the machine-shop.

The trapezoidal section differs substantially from a triangular or diamond form in allowing a wide valve with a sufficient depth in all parts and without any extraordinary depth along the center, which would necessitate an excessive depth of valve-chest.

A valve made on this principle is of course just as applicable to a four-ported seat, the construction being simply varied to suit the case.

I make my valve B of trapezoidal section (transversely) in order that it may be easy to refit in case it becomes worn or cut, and I make it narrower than the width of the ports in order that the steam may always move freely up and down between the several ports in the cylinder-face and the several grooves $c$ in the hood. This makes the device equivalent in effect to a piston-valve, with the advantage that it may be kept always to a steam-tight fit without packing.

I claim as my invention—

1. The flat cylinder-face A, balanced slide-valve B, having flat faces and beveled edges, a corresponding hood, C, and an inclosing steam-chest, allowing the steam to apply on the exterior of the hood, all combined and arranged to serve as herein specified.

2. The plane cylinder-face A, having ports, the hood C, having plane interior surfaces, beveled, as shown, and provided with grooves $c$, and also with ports for relief-openings through into the steam-chest, in combination with the flat valve B, having beveled edges, and with relief-valves E, all arranged for joint operation, as and for the purpose herein specified.

In testimony whereof, I have hereunto set my hand at Indianapolis, Indiana, this 8th day of December, 1885, in the presence of two subscribing witnesses.

MATTHEW ROBERT MOORE.

Witnesses:
 J. G. McDOWELL,
 H. H. HANNA.